United States Patent [19]

Jousson

[11] 4,137,911
[45] Feb. 6, 1979

[54] HYDRAULIC APPARATUS FOR BODY CARE

[75] Inventor: Pierre J. Jousson, Geneva, Switzerland

[73] Assignee: Les Produits Associes LPA S.A., Switzerland

[21] Appl. No.: 796,442

[22] Filed: May 12, 1977

[30] Foreign Application Priority Data

May 26, 1976 [CH] Switzerland ............ 6625/76

[51] Int. Cl.² .............................................. A61H 9/00
[52] U.S. Cl. .................................. 128/66; 128/62 A
[58] Field of Search ............... 128/66, 230, 224, 62 A; 285/8; 251/149.6

[56] References Cited

U.S. PATENT DOCUMENTS

| 3,393,673 | 7/1968 | Mattingly | 128/66 |
| 3,879,013 | 4/1975 | Hajek | 251/149.6 |

Primary Examiner—Lawrence W. Trapp
Attorney, Agent, or Firm—Robert E. Burns; Emmanuel J. Lobato; Bruce L. Adams

[57] ABSTRACT

This hydraulic apparatus for body care, notably buccal care, and for supplying a liquid to a hand appliance, comprises a casing enclosing a pump and power means for driving the pump. The pump input is connected via a valved coupling to the bottom of the detachable reservoir containing the liquid, and the pump output is connected via a hose to the hand appliance. The valved coupling comprises a movable valve member having a flat annular valve surface adapted to engage a registering flat annular seat consisting of the marginal portion of an opening formed in the bottom of the reservoir, when the latter is removed from the casing. Spring means constantly urge the valve member to its seated position.

8 Claims, 4 Drawing Figures

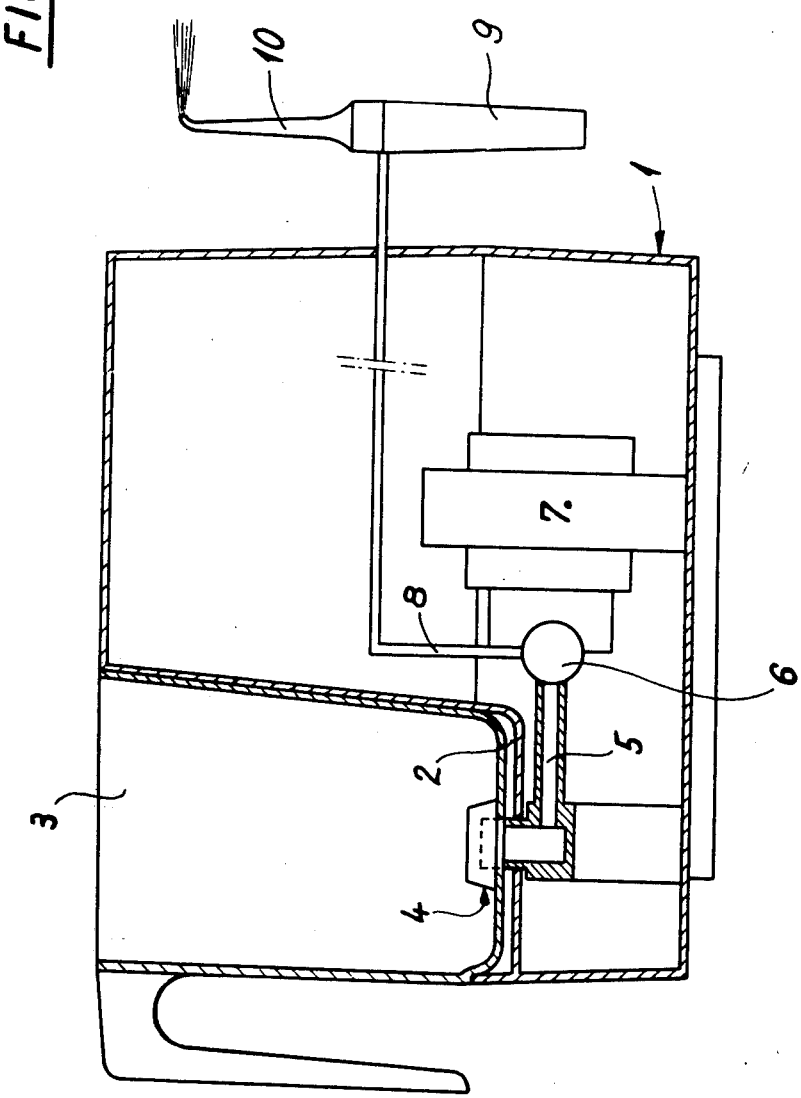

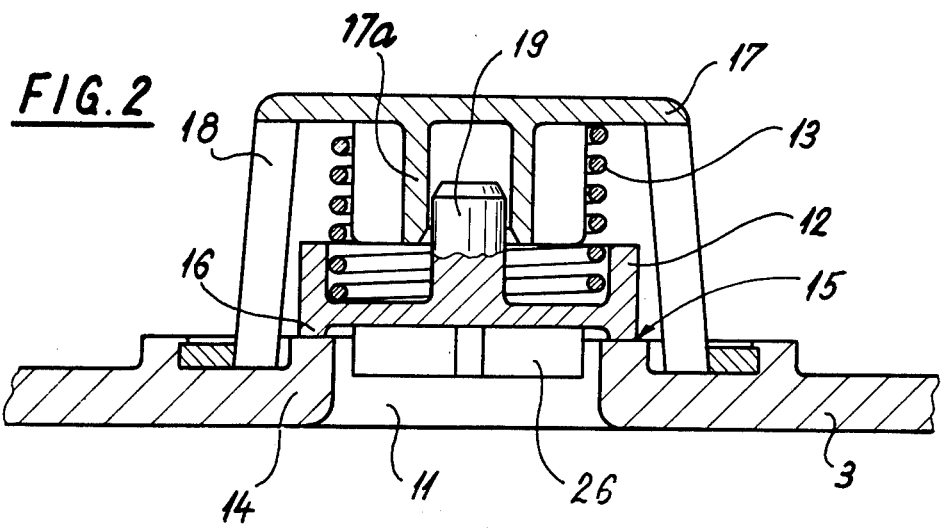
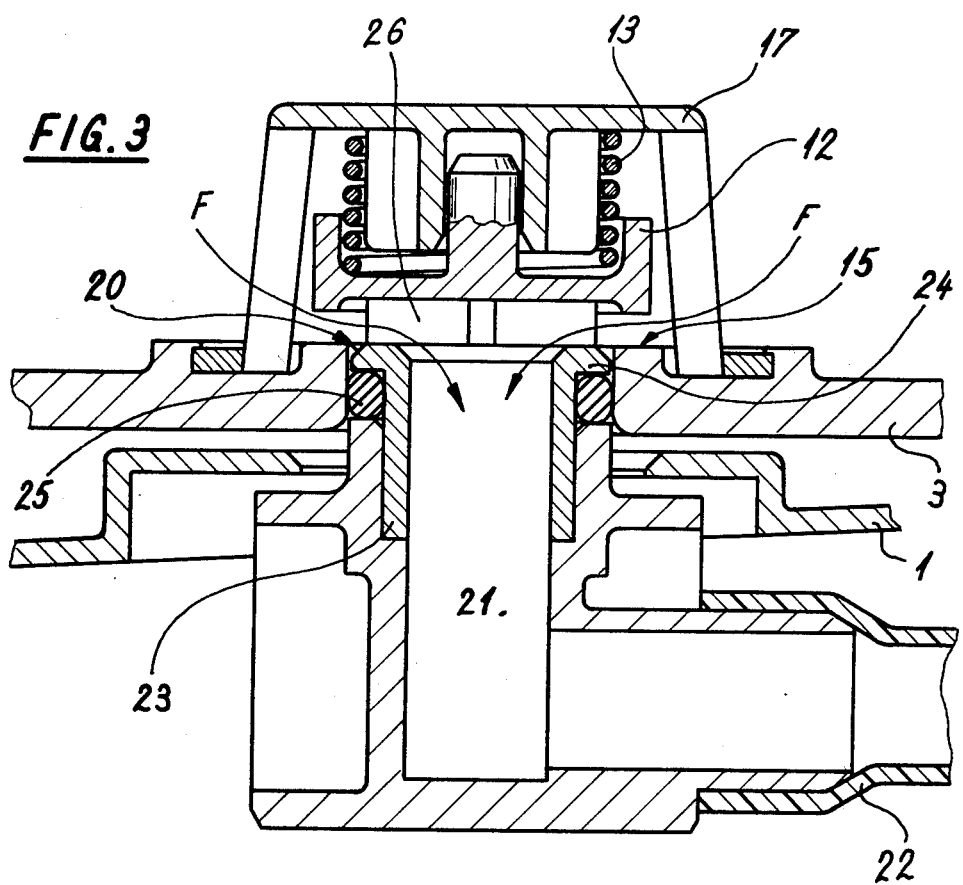

HYDRAULIC APPARATUS FOR BODY CARE

BACKGROUND OF THE INVENTION

1. Field of the Invention

The present invention relates in general to hand-operated hydraulic apparatus and devices for body care and personal hygiene and has specific reference to a hydraulic apparatus for body care which comprises a pump mounted in a casing and connected through a hose to a hand appliance, a detachable reservoir for a liquid, which, in its operative position on top of said casing, is connected to said pump via a coupling comprising on the one hand in said reservoir valve means having an outlet orifice formed by an opening in the lower wall of said reservoir, said opening being closed by the movable member of said valve when the reservoir is detached from the casing, and on the other hand on the top surface of the casing a hollow projection of which the internal passage is connected to the input orifice of said pump, said valve member being unseated by said hollow projection when the reservoir is fitted in its operative position on said casing, an O-ring sealing the joint between the reservoir and the hollow projection.

2. Description of the Prior Art

Hydraulic apparatus of this kind are already known which are used for buccal hygienic care, the pump thereof being adapted to supply a suitable liquid to a spray nozzle and/or to operate a tooth-brush. The coupling connecting the pump to the liquid-containing reservoir comprises a projection formed on the casing, in which said pump is mounted, this projection being adapted to engage the opening formed in the bottom of said reservoir for unseating a valve member normally closing this opening when the reservoir is removed from the casing. Hitherto known valve seats designed for this purpose had complicated, for example rounded or frustoconical shapes.

SUMMARY OF THE INVENTION

It is the essential object of the present invention to provide a hydraulic apparatus for body care, of the type broadly described hereinabove, in which the annular surface surrounding said reservoir opening that is directed towards the interior of the reservoir and acts as a valve seat, is flat, and that the bottom surface of said valve member comprises an annular peripheral marginal surface likewise flat and adapted to engage said seat forming flat surface surrounding said opening.

The essential advantage resulting from this particular configuration of the valve member and of the seat associated therewith is that it can be manufactured with much greater facility in comparison with the manufacture of hitherto conventional valve and seat assemblies having mainly frustoconical or spherical shapes. Thus, much closer machining or manufacturing tolerances can easily be used, thus improving considerably the fluid-tightness between valve and seat.

BRIEF DESCRIPTION OF THE DRAWING

Various forms of embodiment of this invention are illustrated by way of example in the attached drawing, in which:

FIG. 1 is a general diagrammatic and sectional view of the hydraulic apparatus, the section concerning more particularly the coupling;

FIG. 2 is an axial section showing on a larger scale the opening in the bottom of the reservoir with the valve member in its seated position;

FIG. 3 is another axial view showing the coupling between the assemblies reservoir and casing, and also the valve member in its unseated position.

DESCRIPTION OF THE PREFERRED EMBODIMENT

Figure 4:
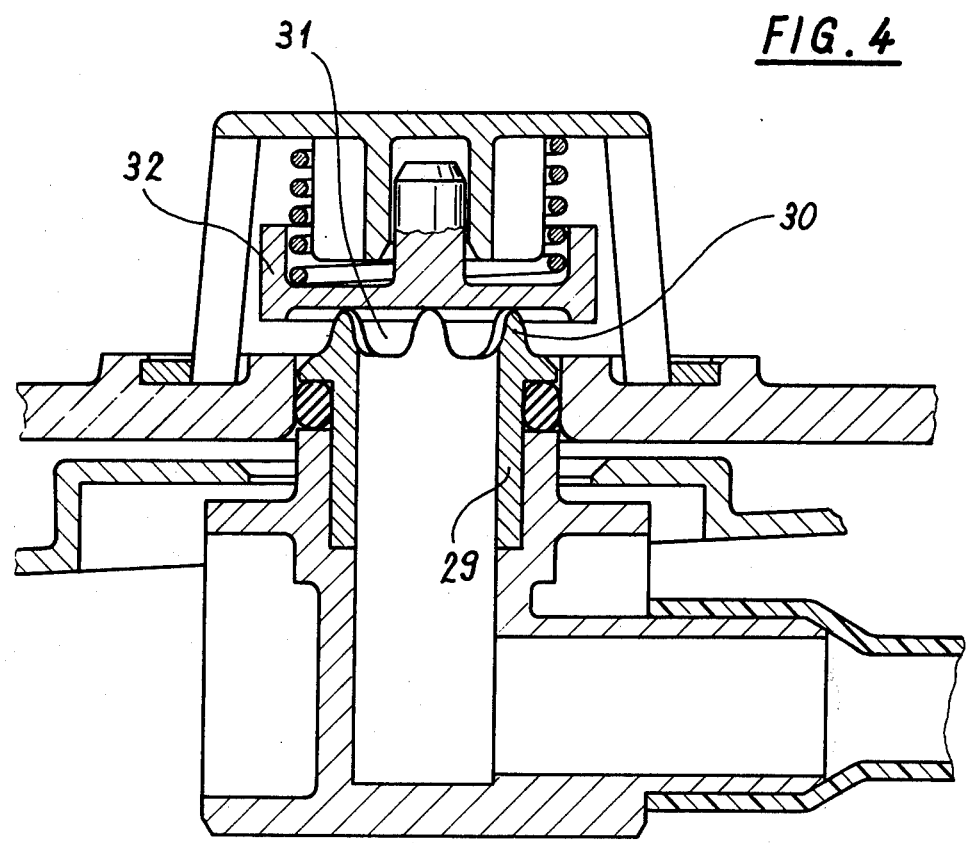
FIG. 4 is another axial section showing a modified embodiment of the coupling.

The hydraulic apparatus for body care, more particularly for buccal care, illustrated in the drawing comprises, as shown diagrammatically in FIG. 1, a casing 1 formed with a lateral shoulder 2 adapted to receive a detachable reservoir 3 for a liquid. In its operative position, that is, when fitted on casing 1, this reservoir 3 is connected via a coupling 4 to an input conduit 5 of a pump 6 driven from an electric motor 7, the delivery or output port of the pump being connected via a hose 8 to a hand appliance 9 for supplying the liquid to a spray nozzle 10 attached to the hand appliance.

The coupling 4 comprises a valve that is housed in the reservoir 3 (FIG. 2). The output aperture of this valve consists of an opening 11 formed in the bottom wall of the reservoir, this opening being normally closed by a valve member 12 responsive to a return spring 13 when the reservoir 3 is removed from the casing 1.

The opening 11 is bounded by an upturned annular marginal portion 14 facing inwardly of reservoir 3 and having an upper flat marginal surface 15 acting as a seat to valve member 12. This valve member 12 is also provided with an annular outer peripheral flat face 16 corresponding to, and facing, the valve seat 15.

The reservoir opening 11 is surrounded by a hollow cap 17 projecting into the reservoir 3 and having slots 18 formed in its skirt to permit the passage of the liquid contained in the reservoir. Preferably, these slots 18 are extremely narrow so as to act as filter means to the liquid product.

The valve member 12 further comprises a small axial stem 19 adapted to slide in the bore of a cylindrical guide member 17a projecting centrally of the underface of hollow cap 17 for properly guiding the valve member to and from its unseated position.

The coupling 4 further comprises (FIG. 3) on the top surface of casing 1 a hollow projection 20 of which the inner passage 21 is connected via a PVC or like hose 22 to the input orifice or port of pump 6.

This projection 20 comprises a small tube 23 fitted in a shouldered portion of the bore forming the passage 21 in the hollow projection 20, said small tube 23 comprising at its upper end an external shoulder 24. An O-ring 25 is disposed between this shoulder 24 and the upper end of passage member 21. When the reservoir 3 is properly fitted in its operative position on the casing (as shown in FIGS. 1 and 3), the hollow projection 20 engages the opening 11 of reservoir 3 and while the O-ring 25 engages the inner peripheral wall of opening 11 the upper end of projection 20 unseats the valve member 12 (FIG. 3).

The arrangement comprising the O-ring 25 is such that the fluid tightness between the opening 11 and projection 20 is preserved until valve member 12 is unseated. To permit the flow of liquid product between the valve member 12 and the internal passage 21 of hollow projection 20 in the direction of the arrows F, radial ribs 26 are formed on the bottom surface of valve member 12 and adapted to be engaged, in the open or unseated position, by the upper end of said hollow projection 20. The length of the radial projections 26 corresponds at least to the radius of the outer wall of said hollow projection.

In a modified form of embodiment illustrated in FIG. 4, the upper end 30 of the wall of tubular member 29 constituting the hollow projection is provided with notches 31, said upper end 30 engaging the bottom flat surface of valve member 32, the other component elements of the coupling remaining unchanged in comparison with those of the first form of embodiment.

Of course, various modifications and changes may be brought to the forms of embodiment shown and described herein without departing from the basic principle of the invention, as will be readily understood by those conversant with the art.

What is claimed is:

1. Hydraulic apparatus for body care comprising a casing, a pump mounted in said casing, a hand appliance, a hose connecting the output of said pump to the inlet of said hand appliance, means for supplying liquid to the inlet of said pump, said means comprising a detachable reservoir for a liquid, said reservoir having a flat bottom whereby said reservoir when detached can be set on a flat supporting surface, said bottom having an opening therein, an in-turned rim surrounding said opening, said rim having an essentially cylindrical inner peripheral surface and an inwardly facing annular surface forming a valve seat, a perforate hollow cap positioned over said opening inside said reservoir, a valve member inside said cap having an annular peripheral portion adapted to seat on said valve seat to close said opening, means in said cap for guiding said valve member in movement between a closed position in which said valve member seats on said valve seat and an open position in which said valve member is spaced from said valve seat, means biasing said valve member toward closed position, means in said casing for supporting said reservoir, a hollow projection in said casing in position to enter said opening in the bottom of said reservoir when said reservoir is positioned on said supporting means, sealing means between said hollow projection and said inner peripheral surface of said opening in the bottom of said reservoir, the end of said hollow projection being engageable with said valve member to move it to open position, means providing fluid passage means between said hollow projection and said valve member to permit liquid to flow from said reservoir into said hollow projection and means connecting said hollow projection with the inlet of said pump.

2. Hydraulic apparatus according to claim 1, in which an inner end portion of said in-turned rim surrounding said opening in the bottom of said reservoir projects inwardly of the bottom wall of said reservoir and terminate in a flat annular surface forming said valve seat, said valve member having a mating flat annular surface engageable with said valve seat.

3. Hydraulic apparatus according to claim 1, in which said means for guiding said valve member comprises a central upwardly projecting pin on said valve member and a downwardly extending hollow projection in said cap slidably receiving said pin.

4. Hydraulic apparatus according to claim 1, in which said biasing means comprises a coil compression spring acting between said cap and said valve member, said valve member and said cap having means for positioning said spring to keep it centered relative to said cap and said valve member.

5. Hydraulic apparatus according to claim 1, in which said means providing fluid passage means between said valve member and said hollow projection comprises radial ribs formed on the lower surface of said valve member and engageable by the upper end of said hollow projection.

6. Hydraulic apparatus according to claim 1, in which said means providing fluid passage means between said valve member and said hollow projection comprises notches in the upper end of the wall of said hollow projection.

7. Hydraulic apparatus according to claim 1, in which said cap is essentially frustoconical and has narrow longitudinal slits in its side wall to permit passage of said liquid and to filter said liquid during such passage.

8. Hydraulic apparatus according to claim 1, in which said hollow projection has an annular groove in its outer periphery near the upper end of said projection and in which said sealing means comprises an O-ring in said groove.

* * * * *